(12) United States Patent
Jepsen et al.

(10) Patent No.: US 9,926,916 B2
(45) Date of Patent: Mar. 27, 2018

(54) MONITORED COMPONENT CONNECTION, WIND POWER INSTALLATION, METHOD OF MONITORING A COMPONENT CONNECTION FOR UNWANTED RELEASE OF THE COMPONENT CONNECTION IN THE CONNECTED CONDITION

(71) Applicant: Wobben Properties GmbH, Aurich (DE)

(72) Inventors: Torsten Jepsen, Aurich (DE); Ralf Kelling, Eversmeer (DE)

(73) Assignee: Wobben Properties GmbH, Aurich (DE)

( * ) Notice: Subject to any disclaimer, the term of this patent is extended or adjusted under 35 U.S.C. 154(b) by 249 days.

(21) Appl. No.: 14/412,165

(22) PCT Filed: Apr. 18, 2013

(86) PCT No.: PCT/EP2013/058088
§ 371 (c)(1),
(2) Date: Dec. 30, 2014

(87) PCT Pub. No.: WO2014/005735
PCT Pub. Date: Jan. 9, 2014

(65) Prior Publication Data
US 2015/0159633 A1      Jun. 11, 2015

(30) Foreign Application Priority Data

Jul. 3, 2012   (DE) .................. 10 2012 211 566

(51) Int. Cl.
*F03D 11/00*        (2006.01)
*G01M 3/26*         (2006.01)
(Continued)

(52) U.S. Cl.
CPC .......... *F03D 11/0091* (2013.01); *F03D 17/00* (2016.05); *G01M 3/26* (2013.01);
(Continued)

(58) Field of Classification Search
CPC ....... F03D 17/00; G01M 3/26; G01M 5/0016; G01M 5/0033; G01M 13/00
See application file for complete search history.

(56) References Cited

U.S. PATENT DOCUMENTS

| 3,820,381 A | 6/1974 | Thurston |
| 4,447,388 A | 5/1984 | Sutton, Jr. |

(Continued)

FOREIGN PATENT DOCUMENTS

| CN | 102080625 A | 6/2011 |
| DE | 197 55 000 C1 | 3/1999 |

(Continued)

OTHER PUBLICATIONS

Verbruggen, "Wind Turbine Operation and Maintenance based on Condition Monitoring WT-Ω," Apr. 30, 2013, retrieved on Mar. 6, 2012, from ftp://ecn.nl/pub/vww/library/report/2003/c03047.pdf, 34 pages.

*Primary Examiner* — Hezron E Williams
*Assistant Examiner* — David Z Huang
(74) *Attorney, Agent, or Firm* — Seed Intellectual Property Law Group LLP (57) ABSTRACT

The invention concerns a monitored component connection comprising a first component forming a holding portion, a second component forming a receiving portion, and a connecting portion which holds the second component to the first component in the connected condition, wherein the connecting portion engages into a connection receiving means of the receiving portion. According to the invention it is proposed that for monitoring for an unwanted connec-
(Continued)

tion weakness in the component connection in the connected condition the connection receiving means can be acted upon with a testing pressure, and the testing pressure can be monitored for a defect deviation which is sufficient to indicate a connection weakness in the component connection in the connected condition.

17 Claims, 8 Drawing Sheets (51) Int. Cl.
    *G01M 5/00*     (2006.01)
    *G01M 13/00*     (2006.01)
    *F03D 17/00*     (2016.01)

(52) U.S. Cl.
    CPC ........ *G01M 5/0016* (2013.01); *G01M 5/0033* (2013.01); *G01M 13/00* (2013.01)

(56) References Cited

U.S. PATENT DOCUMENTS

| | | |
|---|---|---|
| 4,776,206 A | 10/1988 | Armstrong et al. |
| 4,806,913 A | 2/1989 | Schmidt |
| 5,770,794 A | 6/1998 | Davey |
| 6,059,500 A | 5/2000 | Dirmeier et al. |
| 6,119,504 A | 9/2000 | Claus |
| 7,698,949 B2 | 4/2010 | Akdeniz et al. |
| 8,100,660 B2 | 1/2012 | Vronsky et al. |
| 2002/0029614 A1 | 3/2002 | Davey |
| 2002/0092355 A1 | 7/2002 | Davey |
| 2009/0113994 A1 | 5/2009 | Walker et al. |
| 2010/0135796 A1 | 6/2010 | Kavala et al. |
| 2010/0196159 A1* | 8/2010 | Dawson ................ F03D 1/0675 416/87 |
| 2011/0091321 A1 | 4/2011 | Baker et al. |
| 2011/0206510 A1* | 8/2011 | Langen ................ F03D 1/0675 416/61 |

FOREIGN PATENT DOCUMENTS

| | | |
|---|---|---|
| DE | 203 16 544 U1 | 4/2005 |
| EP | 0 380 967 A2 | 8/1990 |
| GB | 564745 A | 10/1944 |
| GB | 2 395 795 A | 6/2004 |
| JP | 2011001941 A | 1/2011 |
| RU | 1795726 A1 | 2/1996 |
| TW | 201111627 A | 4/2011 |
| UA | 76961 C2 | 10/2006 |
| WO | 2009/065174 A1 | 5/2009 |

* cited by examiner

MONITORED COMPONENT CONNECTION, WIND POWER INSTALLATION, METHOD OF MONITORING A COMPONENT CONNECTION FOR UNWANTED RELEASE OF THE COMPONENT CONNECTION IN THE CONNECTED CONDITION

BACKGROUND

Technical Field

The invention concerns a monitored component connection in a wind power installation. The invention further concerns a method of monitoring a component connection for unwanted connection weakness in the component connection in the connected condition.

Description of the Related Art

It is basically known for components or component connections which are exposed to particular loadings to be subjected to separate checks and tests after they have been removed. If the component or the component connection is in serviceable working order, it is fitted into an installation or another technical device again after such a check or test. That procedure is less suitable for technical devices or installations in which removal of a component or dismantling of a component connection would not only entail high costs, but in addition would already be technically complicated or possibly even detrimental for operation of the technical device or installation. That applies, in particular, to rotating components or bearing components for rotating parts; particularly in the case of a bearing component, it is to be assumed that this component has been embedded in, and in operation, dismantling and subsequent renewed installation could be rather detrimental for further operation of the device or installation.

An in situ monitored component connection or a method of monitoring a component connection for an unwanted connection weakness in the component connection in the connected condition is desirable, in particular in such a way that monitoring is possible during operation of the installation in which the component is fitted.

BRIEF SUMMARY

A monitored component connection, a wind power installation and a method of monitoring a component connection for an unwanted connection weakness in the component connection in the connected condition are disclosed, which can be particularly advantageously implemented. In particular, aspects of the invention seek to provide that the component connection, wind power installation and the method use existing aspects in an installation, in particular a wind power installation, and nonetheless permit advantageous implementation. Advantageously, implementing the component connection, the wind power installation and the monitoring method may be done as easily as possible and nonetheless reliably.

For example, a monitored component connection may be provided that includes a first component forming a holding portion, a second component forming a receiving portion, and a connecting portion that holds the second component to the first component in a connected condition. The connecting portion may engage into a connection receiving means of the receiving portion and the connection receiving means may be set at a testing pressure. The monitored component connection may further include a pressure measuring device that is configured to monitor the testing pressure for a defect deviation indicative of a connection weakness in the component connection in the connected condition.

As another example, a wind power installation may be provided that includes a pylon; a pod on the pylon; a rotor coupled to the pod; a plurality of rotor blades coupled to the rotor by a hub; a shaft in the pod that is connected to a generator, wherein the shaft is drivable by the plurality of rotor blades that are coupled to the shaft by the hub, and wherein at least one of the rotor blades is connected to a hub adaptor by a blade bearing; and a monitored component connection as described above on at least one of the rotor and the hub.

As yet another example, a method of monitoring a component connection in a wind power installation may be provided for detecting an unwanted connection weakness in a component connection in a connected condition. The method may include applying a testing pressure to a connection receiving means that is proximate a component connection between a holding component and a receiving component, monitoring the testing pressure in the connection receiving means for a defect deviation indicative a connection weakness in the component connection, and, when a defect deviation is detected, at least one of the following occurs: emitting a test signal, and stopping the wind power installation.

As yet another example, a testing network may be provided that has a plurality of wind power installations as described above and a central testing location adapted to receive a test signal from a testing and monitoring system in relation to at least one of the monitored component connections of the wind power installations.

One or more aspects of the invention are based on the consideration that a component connection as is involved for a monitoring method of the specified kind is formed from a first component forming a holding portion and a second component forming a receiving portion, and a connecting portion which holds the second component to the first component in the connected condition. It is recognized that a connection receiving means of the receiving portion, into which the connecting portion engages, can advantageously be used for monitoring for an unwanted connection weakness in the component connection in the connected condition. It is also recognized that the connection receiving means can be acted upon with a testing pressure and the testing pressure can be monitored for a defect deviation which is sufficient to indicate a connection weakness in the component connection in the connected condition.

In particular, the connection receiving means is used to particular advantage in synergistic relationship not only for connecting the first and second components but in the context of monitoring for applying a testing pressure. That concept also has the advantage that testing pressure monitoring can be effected practically from the same access to the connection receiving means as an application of testing pressure. In other words the concept can thus be implemented comparatively easily as there is no need for further sensors or testing features on the component itself; in addition existing aspects in a component connection are used for monitoring and testing without limiting or markedly weakening the component connection.

Aspects of the invention are found to be particularly effective in relation to a wind power installation in regard to monitoring a component connection between a rotor and a hub, in particular between a blade flange and a blade flange bearing. It is found that in this case dismantling for checking a blade flange and/or a blade flange bearing and/or a connecting portion could be implemented only at a high level of complication and expenditure.

A development which has proven to be advantageous is one in which crack monitoring of component screw means is effected in conjunction with blind hole screw means. That concerns in particular ball bearing rotary connections or roller bearing rotary connections or component connections concerning such bearings or the connecting portions thereof, namely screws, bolts or screw rods or the like. The term crack is used in particular to denote a crack opening or a gaping crack or the like structural openings which in actual fact can endanger operation of the component. In that respect the monitoring function in respect of the monitored component connection or the monitoring method is found to be essential as a safety measure in order to avoid severe damage, possibly even destruction, of a technical device or installation with the monitored component connection.

It has been found that in accordance with a development the detection of fatigue cracks in particular in a blind hole region of a screwed component or the screw itself is in particular proven to be worthwhile to avoid major damage to a technical device or installation. In particular the above-mentioned measures one of the developments could be implemented prior to a complete failure of an installation or technical device.

Pressure implementation is particularly preferred, in particular using an increased pressure or a reduced pressure, applied to a threaded hole. As a result cracks, gaping cracks or other damage openings would lead to leakages which can be detected by pressure monitoring. In that respect defect deviation in relation to the testing pressure is used to denote any deviation from a defined pressure, which is sufficient to indicate a connection weakness in the component connection in the connected condition. The term connection weakness in the component connection is used basically to denote any opening formation or cracking gap which releases the component connection or opens it or partially loosens it.

In particular in accordance with the monitoring method cyclic pressure application can be effected, for example once per day, to permit practically continuous monitoring with regular monitoring cycles.

In particular an application of pressure can be effected laterally through less heavily loaded surrounding components or centrally through hollow-bored connecting members or the connecting member like a screwthreaded bolt or the like.

In accordance with a development, there are provided one or more seals or sealing means to seal off the connection receiving means in such a way that only a leakage caused by a defect can result in the testing pressure being affected. The connection receiving means is one of some regions which are particularly heavily loaded or endangered and which can generally advantageously be exposed to a testing pressure; in particular they can be monitored, with possible detection of a defect deviation. For example for that purpose a screw connection, in particular a screw bolt or a screw, can be sealed off at its thread region in a connection receiving means, for example by a sealing band or the like.

Component monitoring provides protection in operation from damage situations due to component failure. Particularly in the case of a wind power installation for example it is possible to prevent a blade being torn off or the like, in good time. Required monitoring intervals can possibly be increased in length or reduced in length, depending on the age condition of an installation.

BRIEF DESCRIPTION OF THE SEVERAL VIEWS OF THE DRAWINGS

Embodiments by way of example of the invention will now be described hereinafter with reference to the drawing. These are intended to show the embodiments not only necessarily to scale but rather the drawing which serves for explanation purposes is shown in diagrammatic and/or slightly distorted form. In regard to supplements to the teachings which can be found directly from the drawing, attention is directed to the pertinent state of the art. It is also to be taken into consideration that many different modifications and alterations concerning the form and detail of an embodiment can be implemented without departing from the general idea of the invention. The features of the invention which are disclosed in the description, in the drawing and in the claims can be essential both individually and also in any combination for development of the invention. In addition the scope of the invention embraces all combinations comprising at least two of the features disclosed in the description, the drawing and/or the claims. The general idea of the invention is not limited to the exact form or detail of the preferred configuration described and illustrated hereinafter or is not limited to a subject which would be restricted in comparison with the subject-matter claimed in the claims. In regard to specified dimensional ranges values lying within the specified limits are to be disclosed as non-equilibrium values and can be used as desired and claimed. Further features, advantages and details of the invention will be apparent from the description hereinafter of the preferred embodiments and with reference to the drawing in which:

FIG. 6 shows still a further variant of the embodiments of FIGS. 3 to 5, FIG. 7 (I) shows a diagrammatic view of a testing and monitoring system for monitoring a component connection, FIG. 7 (II) shows a particular embodiment of the testing and monitoring system which can be connected in a monitored component connection in FIGS. 2 to 6.

DETAILED DESCRIPTION

Figure 1:
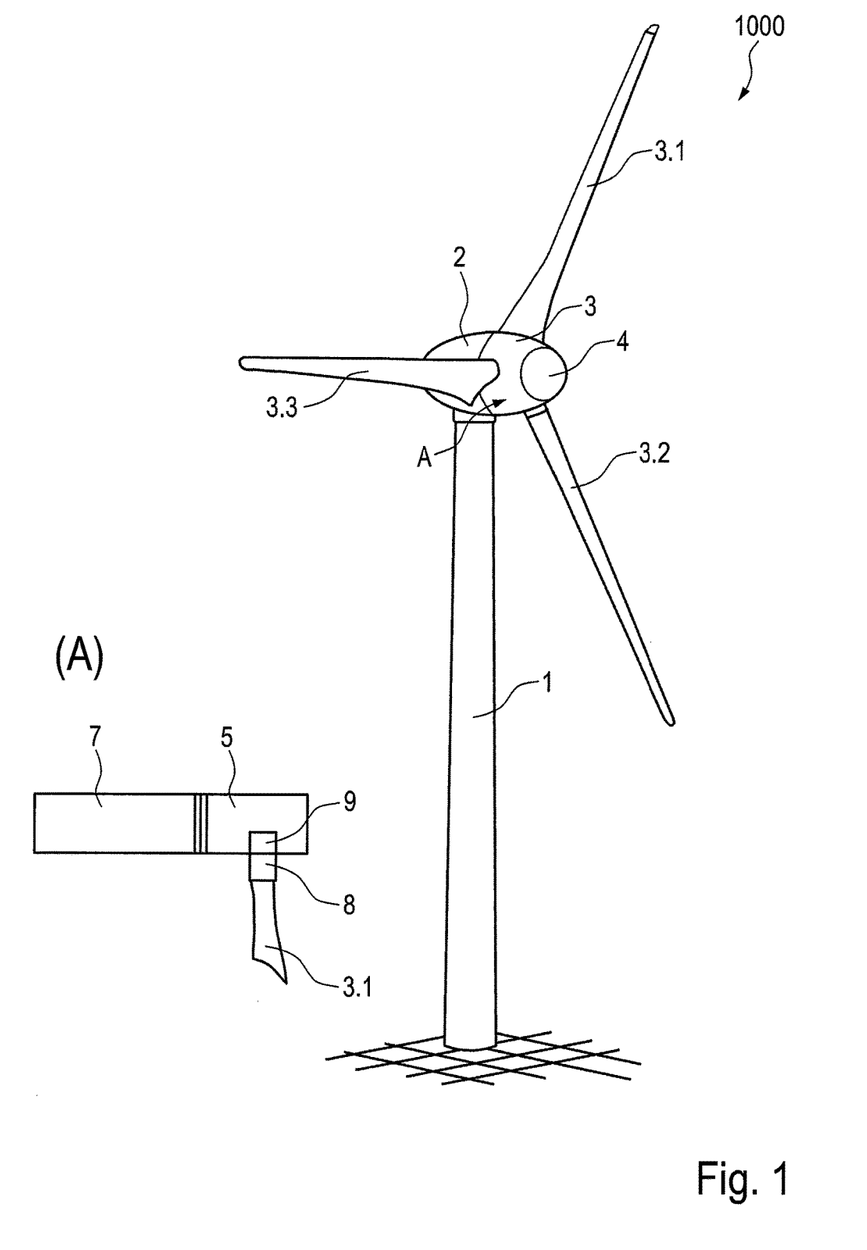
FIG. 1 diagrammatically shows a wind power installation.

FIG. 1 shows a wind power installation 1000 comprising a pylon 1, a pod 2 and a rotor 3; the latter having three rotor blades 3.1, 3.2, 3.3 coupled thereto. The rotor blades are connected by way of a spinner 4 to a hub 5 which is shown in detail in FIG. 1 and drives a generator 7 for generating electric current. By way of example detail (A) in FIG. 1 shows the mounting of a rotor blade 3.1 to the hub 5. The rotor blade 3.1 is connected to a hub adaptor 9 by way of a blade bearing 8. The configuration of that connection is described in greater detail in FIGS. 2 to 12 hereinafter.

Figure 2:
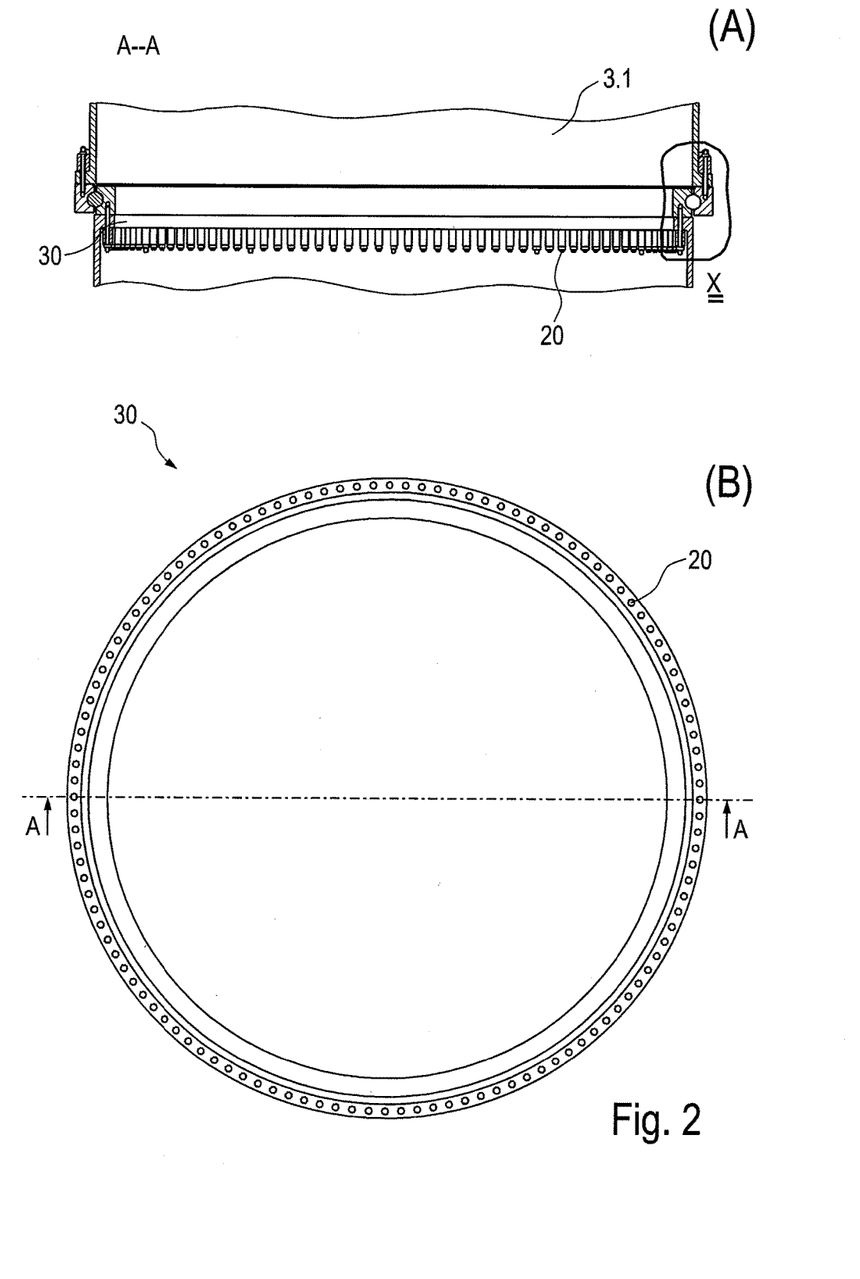
FIG. 2 shows a blade bearing—in the present case by way of example in relation to a wind power installation as shown in FIG. 1—in a plan view in view (B) and in a sectional side view along section line A-A in view (A)
Figure 3:
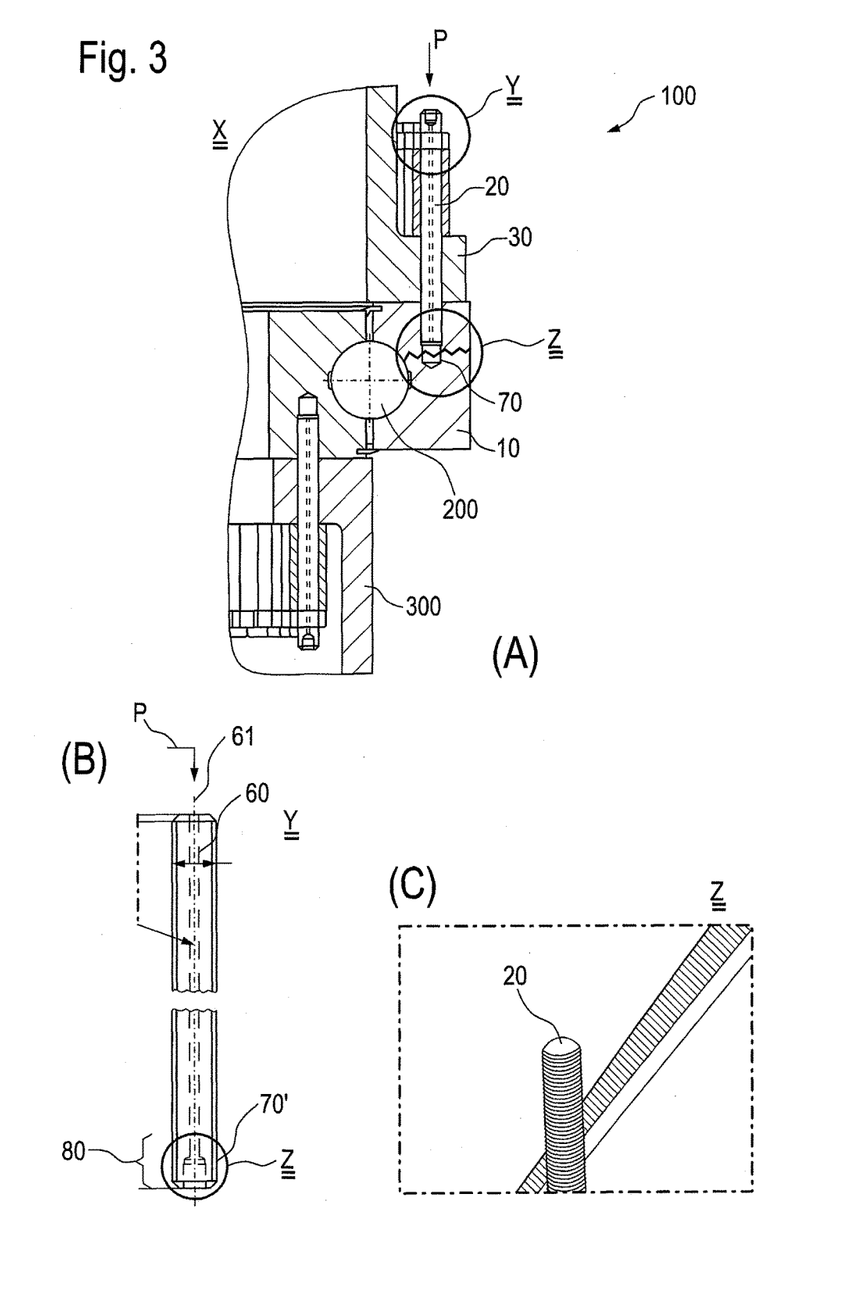
FIG. 3 shows the detail X in FIG. 2 in section with a blade flange and a blade flange bearing in view (A) and in view (B) a connecting means in the form of a screw bolt with a through a passage and in view (C) a thread of the threaded rod, the thread being sealed off in relation to the blade flange bearing and/or the blade flange.

In that respect FIG. 2 shows by way of example for the first blade 3.1 in the view (B) a blade flange 30 forming a holding portion as a first component in accordance with the concept. It is also possible to see a series of connecting portions 20 in the form of a plurality of screws on the blade flange. The connecting portions 20 are arranged in a concentric peripheral row along the blade flange 30. The detail X in FIG. 2A is shown on an enlarged scale in FIG. 3A and shows in detail the lower end of the blade flange 30 in the form of the configuration of the first component, forming a holding portion, as well as the connecting portion 20 in the form of the screw bolt which holds the blade flange 30 to the blade flange bearing 10, as a configuration of the second component forming a receiving portion. In the present case the monitored component connection is formed by the blade flange bearing 10, the screw bolt 20 and the blade flange 30. It will be seen from FIG. 3A that a crack 50 can be formed in particular in a lower region of a connection receiving means 70, in the illustrated embodiment a blind hole, which crack can also occur at a sensitive location on the blade flange bearing, as is shown hereinafter only by way of example for the component connections 100, 101 . . . 108. The measures described hereinafter can accordingly be equally used for other component connections which are not shown in detail. Herein the same references are used throughout for identical or similar parts or parts of an identical or similar function.

In accordance with the concept in a first variant the connecting portion shown in greater detail for the detail Y in FIG. 3A in FIGS. 3B and 3C, in the form of the screw bolt, is provided with a through passage 60 extending along the center line 61 of the connecting portion 20 over the entire length thereof. Thus the passage 60 connects the open region of the blind hole to an open end of the connecting portion 20. At the limit region 70' of the connection receiving means 70, in the illustrated embodiment a blind hole, the connecting portion 20, as shown in FIG. 3C, is sealed off with a seal, such as a Teflon strip. In the present case the Teflon strip is wound over the thread of the threaded bolt and thus seals off the connection receiving means 70 in a sealing region 80. A testing pressure p is introduced by way of the passage 60 thus remains in the lower region of the connection receiving means 70 in the form of the blind hole and can only escape if there is a crack or the like opening 50 in the region of the blind hole.

In the present case the blade flange bearing 10 is a ring carrying a rotary bearing 200 which adjoins the hub adaptor 300. The hub adaptor 300 is in turn connected to the hub 5 diagrammatically shown in FIG. 1.

Figure 4:
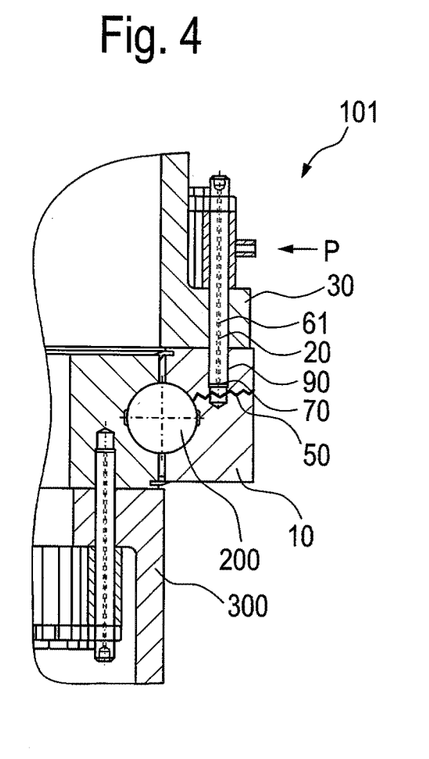
FIG. 4 shows a variant of the embodiment of FIG. 3.

FIG. 4 in a variant, with reference to the same references for basically identical or similar features and features of identical or similar function, shows a component connection 101 which again can be monitored with a testing pressure p. For that purpose a testing pressure p is introduced laterally into an intermediate space between the connecting portion 20 and the blade flange 30. The testing pressure p passes in the limit region 90 between the connecting portion 20 and the blade flange 30 to the connection receiving means 70, namely at the lower end thereof, to the blind hole. Once again cracking 50 can be detected on the basis of a defect deviation, that is, a pressure above or below a particular threshold.

Figure 5:
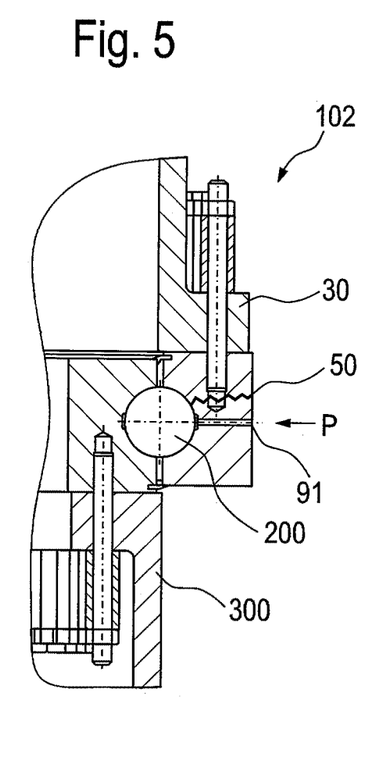
FIG. 5 shows a further variant of the embodiment of FIG. 3 or FIG. 4.

FIG. 5 in a further variant shows the possible option of being able to apply a testing pressure p directly to a lubrication bore 91, in a component connection 102. A bearing internal space could be put under a slightly increased pressure at one or more locations by way of a lubrication bore 91 or a number thereof. A measurement in respect of leakage air flow can be obtained by way of testing pressure detection of the testing pressure p. That can prove to be advantageous as basically the existing bearing sealing involves an expectation of only slight leakage effects.

Figure 6:
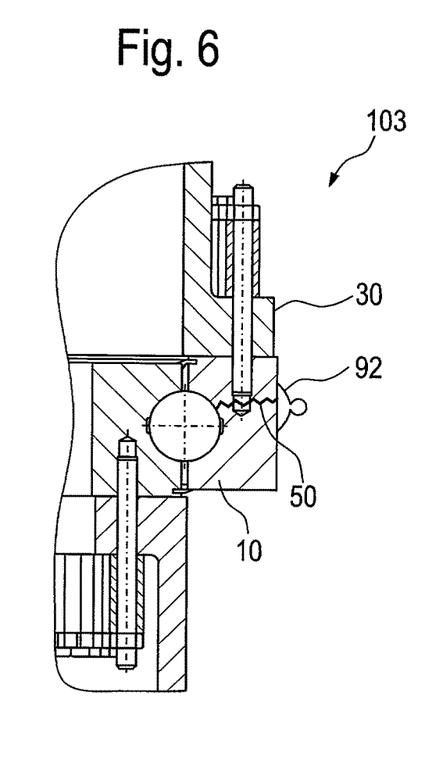

FIG. 6 shows in a further variant of a monitored component connection 103, the possibility of applying a testing pressure p by way of pressure or suction cups 92 at susceptible regions of a component connection, in the present case the blade flange bearing 10. Suction cups which are subjected to a reduced pressure or also suction cups 92 which are subjected to increased pressure and which have a crack 50 developing thereneath have a markedly detectable leakage effect. It would be possible to connect a series of suction cups by way of a common supply line. By way of a central pump with pressure sensor, it is possible to detect whether a crack has developed under one of the suction cups. Cyclic monitoring, for example daily, would be sufficient. The suction cups could even be glued fast at the sealing edge in order to keep down basic leakage.

Figure 7:
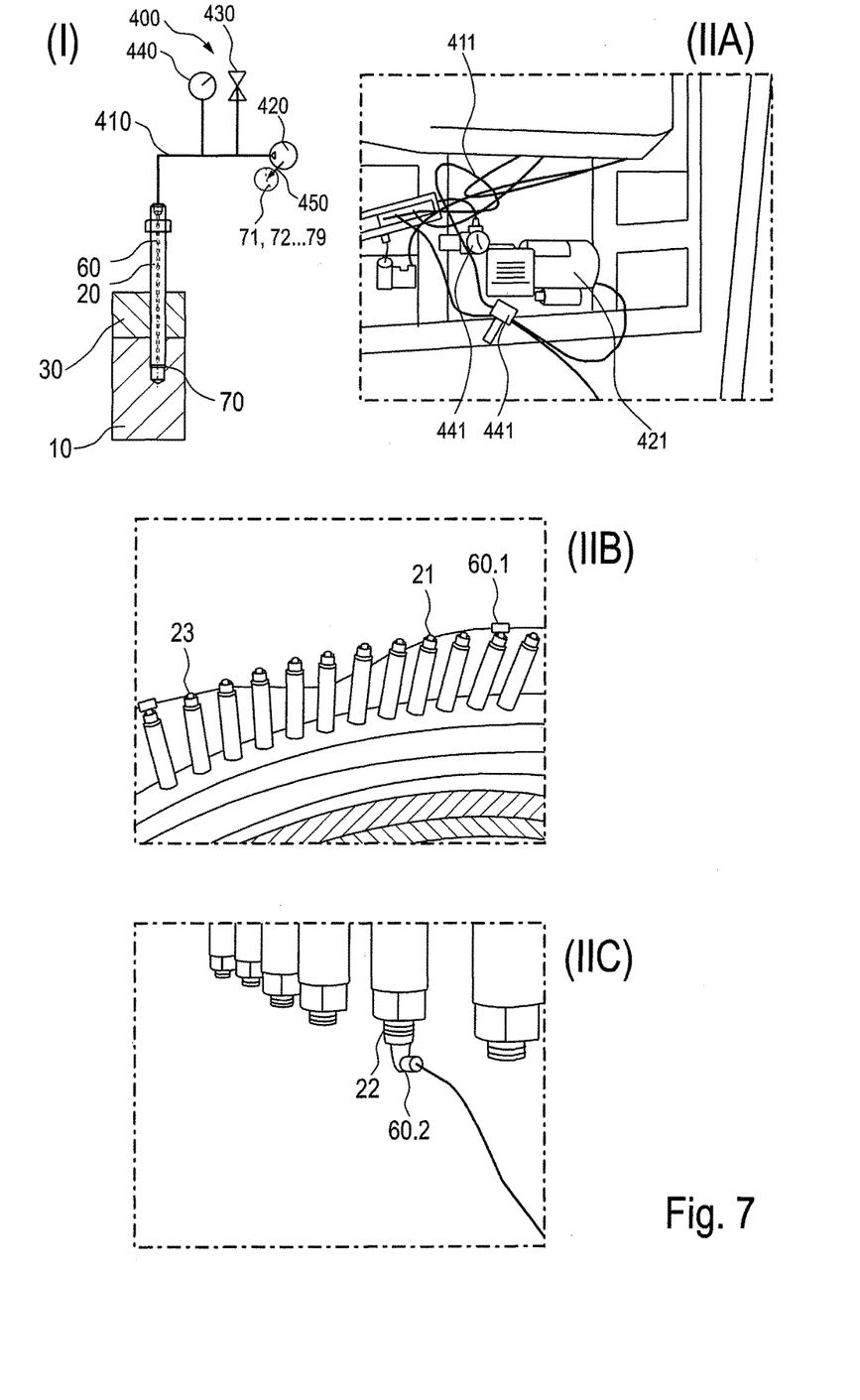

FIG. 7 in a view I shows the structure in principle of a monitored component connection, wherein once again the same references are used for identical or similar parts or parts of an identical or similar function so that attention is directed to the foregoing description. In addition the Figure shows a testing system 400 with a pressure line 410 to the passage 600. On the other side the pressure line 410 is connected to a compressor or the like pressure source 420 which can apply testing pressure to the passage 60 by way of the pressure line 410 depending on the respective position of a switching valve 430. The testing pressure p can be taken off by way of a pressure measuring device 440. Application of pressure by a number of further pressure lines, similar to the pressure line 410, can be effected by way of a distributor switch or the like, and pressure switching element, such as for example a valve distributor or the like here referred to as the distributor 450. In that way a number of further passages in addition to the passage 60 can be acted upon with compressed air. This can be connection receiving means 71, 72 and so forth to 79 or more connection receiving means (not identified here) (for example twelve connection receiving means) which are selected in accordance with an angled distribution, for example a connection receiving means every 30°.

FIG. 7 in views IIA to IIC shows in detail configurations of the components of FIG. 7 I. FIG. 7 II (A) shows a pump 421 for forming a pressure source and a barometer 441 for forming a pressure measuring instrument 440. A line system 411 can be acted upon with compressed air by way of a switching valve 441. The line system 411 is shown in greater detail in FIG. 7 II (B) and connects each tenth connecting portion 20 in the form of a screw to a respective passage 60 and a connection receiving means 70 for pressurization purposes with compressed air. The connection locations in the form of T-portions 60.1 or end portions 60.2 to the connected screw bolts 21, 22, 23 are shown by way of example in FIGS. 7 II (B) and 7 II (C).

Figure 8:
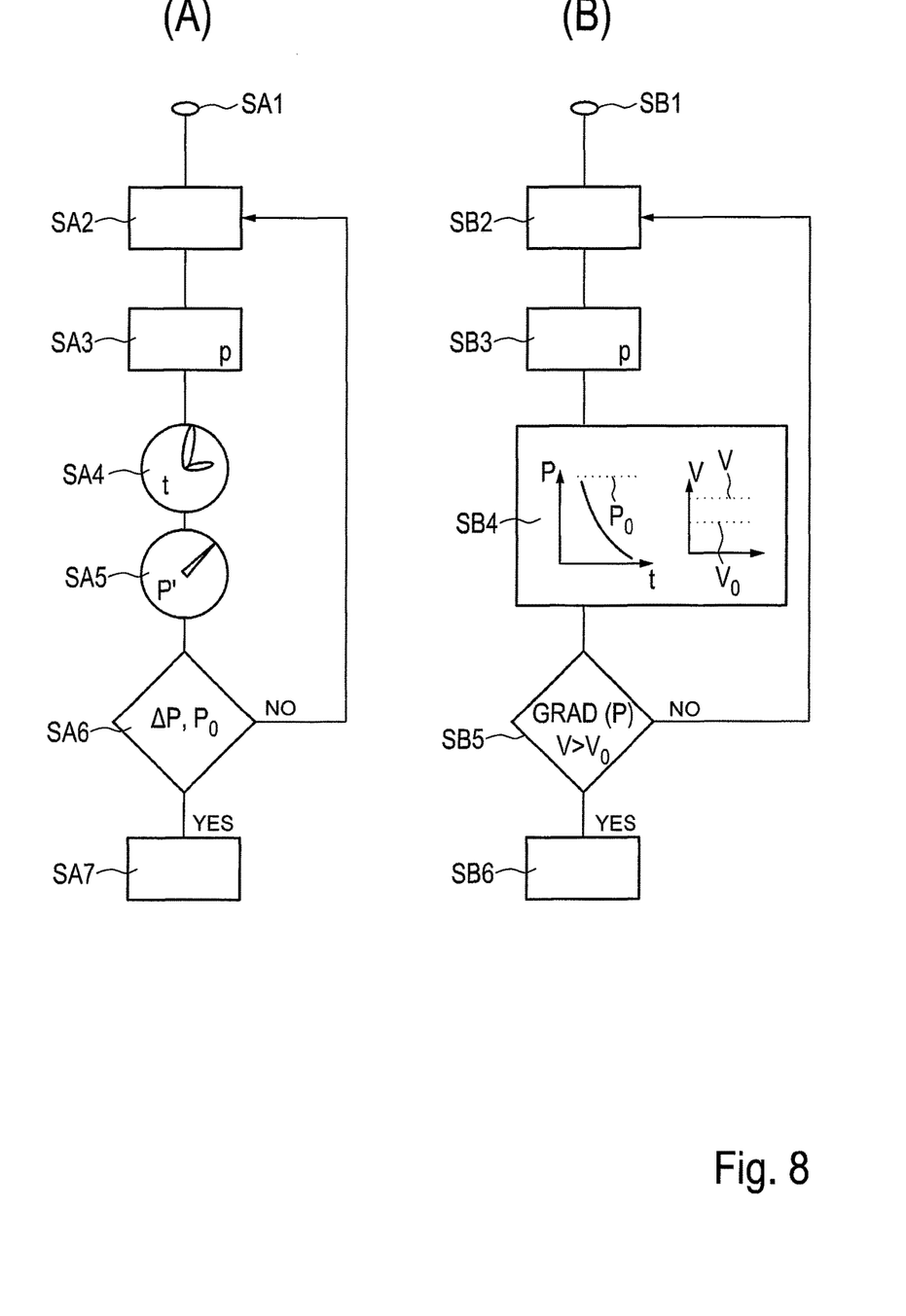
FIG. 8 shows a first process diagram (A) illustrated in the form of a flow chart and a second process diagram (B) of a method of monitoring a component connection for an unwanted connection weakness in the component connection in the connected condition, in particular for the detection of a gaping crack or the like severe structural weakness in a component connection which directly endangers the durability of the component connection.

FIG. 8 in view A shows a first preferred embodiment of a method of monitoring a component connection for an unwanted connection weakness in the component connection in the connected condition. For that purpose in a first step SA1 a pressure testing system 400 is connected to the component connection—for example a component connection 100, 101-103 shown in the above-described Figures. In a further step SA2 the system is vented and in a third step SA3 a connection receiving means 70 of the component connection 100, 101-103 is acted upon with testing pressure p by operation of a pressure source such as for example a pump 421. In a fourth step SA4 a counter, in particular here a time counter, is started, and a pressure P' is measured after the expiry of a measurement time t. If after the time t the pressure P' should deviate from the testing pressure p by a significant defect deviation which is sufficient to indicate a connection weakness in the component connection in the connected condition it is then assumed that the component connection in the connected condition has a considerable defect, for example it has a gaping crack or has become unacceptably loose. A significant defect deviation occurs for example when a detected pressure p' deviates from the testing pressure p (increased pressure) of the step SA3, in the step SA6, by a value which is greater than $\Delta P$ (for example it is below the testing pressure by more than $\Delta P$) or if the detected pressure p' is below a threshold pressure of $P_0$. In this case in a seventh step SA7 an alarm or another testing signal can be given for example by way of a radio signal or a fixed data connection. In this case the method can preferably be implemented on a wind power installation 1000 in FIG. 1 so that defect monitoring of the wind power installations or in a plurality of wind power installations 1000 can be effected at a central location. The testing network having a plurality of monitored component connections 100, 101, 102, 103, in particular a plurality of wind power installations 1000 and a central testing location adapted to receive a testing signal, in particular for wirelessly receiving a testing signal from a testing and monitoring system as shown in FIG. 7 in relation to the monitored component connection is suitable for that purpose.

FIG. 8B shows a modification of the monitoring method which in a first step SB1 connects a testing pressure system 400 to a component connection 100, 101-103 in FIGS. 2 to 7. In a second step SB2 the testing pressure system 400 and the component connection 100, 101-103, that is to say the connection receiving means 70 and the passage 60, is vented. In a third step SB3 the system and the connection receiving means 70 is subjected to a testing pressure p. In a step SB4 the configuration of the detected testing pressure p'—that is to say a function p(t)—is recorded as a function of time t. Naturally in a modification the testing pressure p can also be held to a value $p_0$ and then a measurement is made as to whether a significant volume flow V above the threshold flow $V_0$ in the pressure source must be employed to maintain the pressure p at $p_0$. In a step SB5 for example the method detects whether in the first case the pressure drop GRAD(p) is above an allowed pressure gradient GRAD0(p). In the second case it is possible to test whether the volume flow V is above a threshold flow $V_0$ to maintain a given pressure amplitude $p_0$. If this is the case in a sixth step SA6 it is possible to recognize a defect deviation which is sufficient to indicate a connection weakness in the component connection in the connected condition. In this case once again a central location or the like can be advised about a malfunction or a connection weakness or unacceptable damage to the component connection 100, 101-103 of a wind power installation 1000.

In both methods in FIGS. 8A and 8B a service can also be directly advised along a path yes or stoppage of the installation can be implemented to perform more precise viewing of the installation conditions and possibly initiate repair measures. In the other situation—that is to say for the situation where a defect deviation is not found—a cycle can be initiated along a path no, which repeats the steps SA2 to SA6 and SB2 to SB5 respectively.

Figure 9:
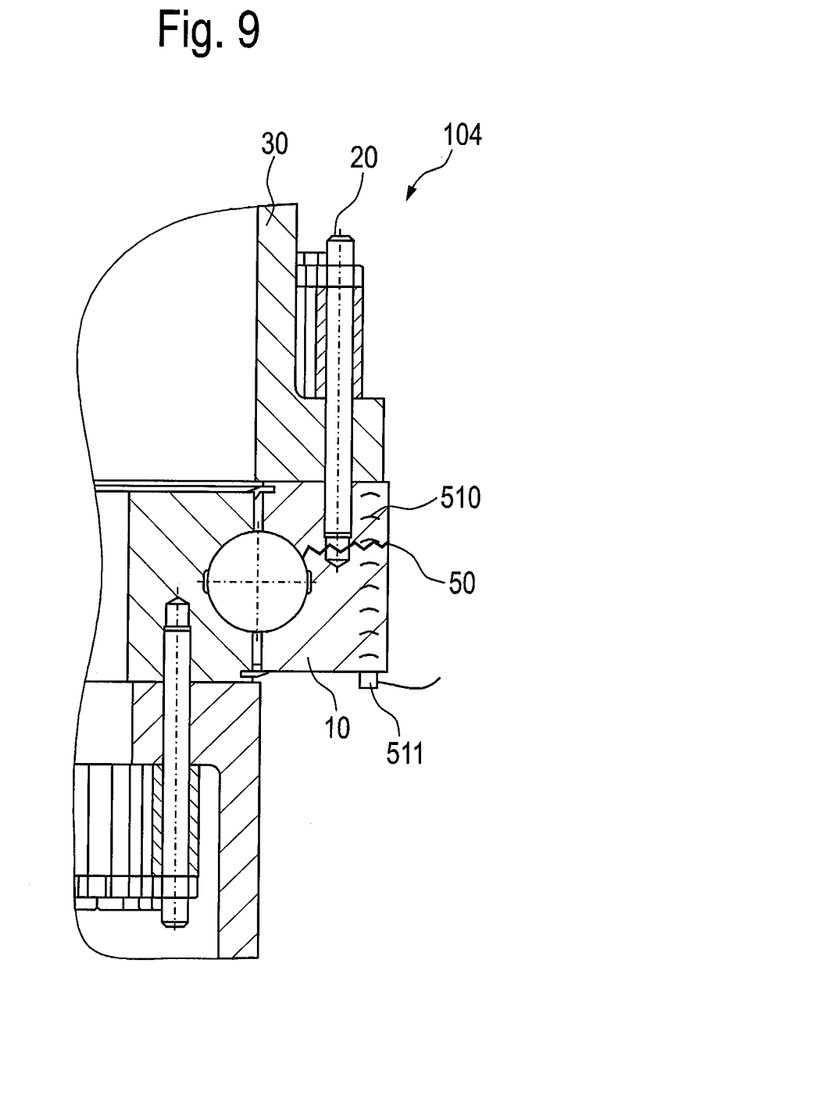
FIGS. 9 to 12 show further variants of monitored component connections—in the present case by way of example in a wind power installation—for describing other possible forms of monitoring of the component connection for an unwanted connection weakness in the component connection in the connected condition.

FIGS. 9 to 12 show further embodiments in accordance with variants of the concept, more specifically FIG. 9 showing a further component connection 104 in a wind power installation 1000, in which respect reference is directed to the description relating to FIGS. 2 to 4, with reference to identical or similar parts denoted by the same reference numerals. In a modification shown here in FIG. 9 and FIG. 10, FIG. 11 and FIG. 12, for an enlarged monitoring method, it is provided that a bridge between the first and second components 30, 10 is acted upon with a testing dimension. Monitoring of the testing dimension for a defect deviation can then be effected. If the defect deviation should be sufficiently high to indicate a connection weakness in the component connection in the connected condition a service measure or shut-down of the wind power installation 1000 for repair purposes can be effected. FIGS. 9 to 12 show in the present case alternatives which essentially rely on the fact that a bridge between the first and second components is crucial to detect a defect, and this can be detected therefore with a testing dimension. That is in particular a change in length between the first and second components 10, 30, namely for example the blade flange and the blade flange bearing. In the case of the concepts shown by way of example in FIGS. 9 to 12 accordingly the connecting portion 20 or the connection receiving means 10 play a subordinate part; rather, in this case it is the spacing between the components 10, 30—here the blade flange and the blade flange bearing—that is crucial.

Referring to FIG. 9 there can be provided a measuring arrangement 510 with an ultrasound measuring unit 511 on the component connection 104. More specifically, there is basically the principle of testing by means of an acoustic procedure as to whether the spacing between the blade flange and the blade flange bearing (components 30, 10) has changed. Similarly to the acoustic method or sound samples, a change in the natural frequency or its radio of the cracked system could be detected. In principle non-acoustic methods such as optical methods or laser methods or the like are also suitable for detecting a spacing between blade flange and blade flange bearing of the first and second components 30, 10. In principle the spacing between a flange surface of the blade flange bearing relative to a flange surface of the rotor blade can be monitored in that way. A surface of the hub adaptor 300 can also serve as the reference. Similarly the ultrasound method shown in FIG. 9 can implement irradiation of the blade flange bearing 10, for example from below. Thus a backwall echo from the blade flange 30 or a boundary thereof to the blade flange bearing can be detected. A plurality of oscillators 511 can possibly be operated in parallel on an evaluation device. Alternatively detection by way of a winding head is also conceivable.

Figure 10A:
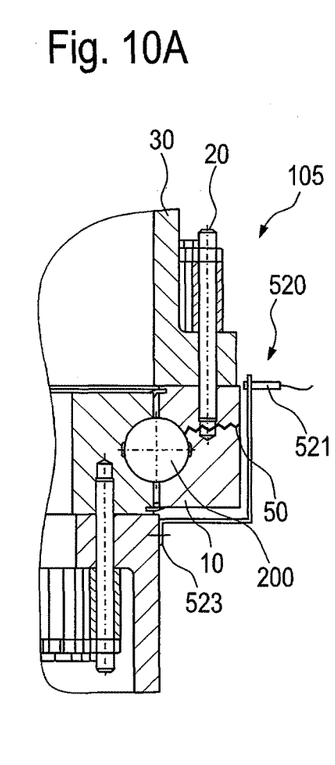
Figure 10B:
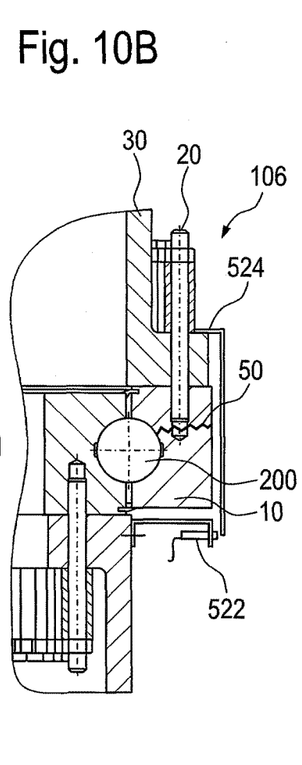

FIG. 10 in view A and view B shows two different possible options of detecting a spacing between the blade flange 30 and the blade flange bearing 10 by way of pulsors 521, 522. For that purpose a measuring arrangement 520 has a first pulsor 521 and 522 respectively and a measuring point, which function as transmitter-receivers. By way of a plurality of pulsors at the periphery, it would be possible to measure at the hub adaptor against the edge relative to the blade flange. A rupture of the screw means, that is to say the component connection 105, 106 of the blade flange bearing 10, can also be automatically detected by way of the pulsors 521, 522. The measuring chain could also be enlarged to the upper edge of the blade flange 30, as shown in FIG. 10 B. Screw ruptures in the blade flange screw means would also be monitored in that way.

Figure 11:
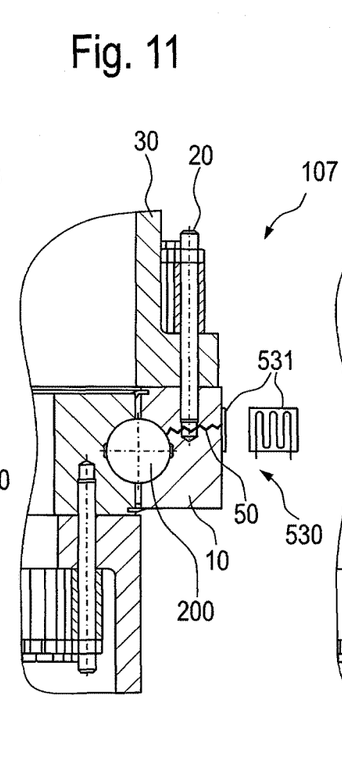

FIG. 11 shows a further monitored component connection 107 with a quiescent current loop, for example with a measuring arrangement 530 which has a wire strain gauge 531. By applying a quiescent current loop of meander form around the damage region to be observed it is possible to provide a monitoring action. In particular the quiescent current loop can be glued in place in the form of a wire strain gauge. Instead of a wire strain gauge 531 it is also possible to use a simple film carrier with for example vapor-deposited conductor items or the like.

Figure 12:
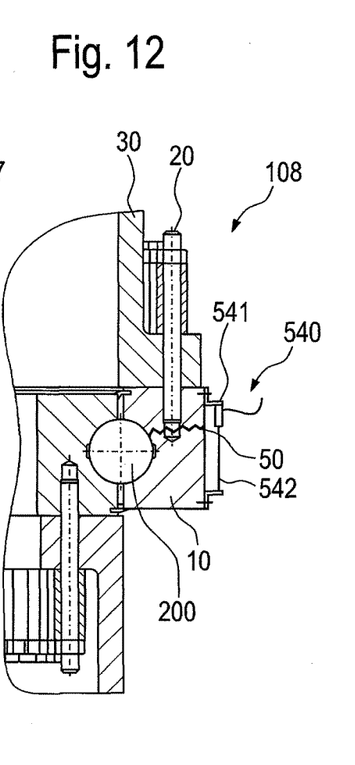

FIG. 12 shows a further monitored component connection 108 with a measuring arrangement 540 which includes an electric and/or magnetic resistance measuring unit. In particular in the present case there is a microswitch 541 as a comparatively simple implementation. By way of a microswitch in a quiescent current loop the changes in path linked to a crack, in the region of 1 to 2 mm, could be detected, for example. A plurality of microswitches at the inside and outside diameters will be advantageous. Preferably there can be provided a pushrod 542 to be able to monitor a comparatively wide region. If a crack 50 of the above-described kind should occur in the blade flange bearing 10 the microswitch 541 with pushrod 542—here arranged in particular in the endangered region of the rotary bearing 200—would interrupt the contact and thus indicate the defect.

LIST OF REFERENCES 0 threshold current
1 pylon
2 pod
3 rotor
3.1, 3.2, 3.3 three rotor blades
4 spinner
5 hub
7 generator
8 blade bearing
9 hub adaptor
10 first component, in particular blade flange bearing
20 connecting portion, in particular screw bolt
21, 22, 23 screw bolt
30 second component, in particular blade flange
40 connection receiving means
50 crack, in particular crack formation, opening or the like
60 passage
60.1 T-portion
60.2 end portion
61 center line
70 connection receiving means, in particular blind hole
70' connection receiving means
71-79 connection receiving means
80 sealing region
90 boundary region
91 lubrication bore
92 pressure or suction cups
100, 101, 102, 103 component connection
104, 105, 106, 107, 108 component connection
200 rotary bearing
300 hub adaptor
400 testing system, in particular pressure testing system
410 pressure line
411 line system
420 pressure source
421 pump
430 switching valve
440 pressure measuring device, in particular instrument
441 barometer
450 distributor
510 first measuring arrangement
520 second measuring arrangement
521 first pulsor
522 second pulsor
523, 524 measuring point
530 third measuring arrangement
531 wire strain gauge
540 fourth measuring arrangement
541 microswitch
542 pushrod
1000 wind power installation
p testing pressure
p' taken-off testing pressure
$p_0$ threshold pressure
ΔP pressure difference
p0 pressure amplitude
SA1-SA7 first to seventh steps of the first variant
SB1-SB6 first to sixth steps of the second variant
t measuring time
V volume flow
$V_0$ threshold flow The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wind power installation comprising:
a pylon;
a pod on the pylon;
a rotor coupled to the pod;
a plurality of rotor blades coupled to the rotor by a hub;
a shaft in the pod that is connected to a generator, wherein the shaft is drivable by the plurality of rotor blades that are coupled to the shaft by the hub, and wherein at least one of the rotor blade is connected to a hub adaptor by a blade bearing; and
a monitored component connection on the rotor and/or the hub for detecting an unwanted connection weakness in a component connection in a connected condition, the monitored component connection including:

a first component forming a holding portion,
a second component forming a receiving portion, and
a connecting portion that holds the second component to the first component in a connected condition, wherein the connecting portion engages into a connection receiving means of the receiving portion, wherein the connection receiving means is configured to be set at a testing pressure, wherein the connecting portion has a through passage that is configured to be coupled to a pressure source for setting the testing pressure, the through passage extending along an entire length of the connecting portion and leading to the connection receiving means,
an intermediate space between the connecting portion and the first and second components that forms a passage configured to be coupled to a pressure source for applying the testing pressure, wherein:
the component connection is a bearing connection that includes a screw connection between a flange and a flange bearing,
the receiving portion is adapted for receiving a ball or roller rotary connection,
the holding portion is a blade flange, the receiving portion is a blade flange bearing, and the connecting portion is a screw connection between the blade flange and the blade flange bearing, and
a series of connecting portions in the form of a plurality of screws are arranged in a concentric peripheral row along the blade flange, and
a pressure measuring device configured to monitor the testing pressure for a defect deviation indicative of a connection weakness in the component connection in the connected condition.

2. The wind power installation according to claim 1 wherein the connecting portion is a screw or a screw rod.

3. A testing network having a plurality of wind power installations according to claim 1, and a central testing location adapted to receive a test signal from a testing and monitoring system in relation to at least one of the monitored component connections of the plurality of wind power installations.

4. The monitored component connection according to claim 1 wherein a defect deviation indicative of a connection weakness in the component connection in the connected condition is a pressure that is below or above a threshold value.

5. A method comprising:
monitoring a component connection in a wind power installation for detecting an unwanted connection weakness in a component connection in a connected condition, the wind power installation comprising a pylon, a pod, a shaft in the pod, the shaft being coupled to a generator, wherein the shaft is drivable by a plurality of rotor blades on a rotor, wherein one of the rotor blades is connected to a hub adaptor by a blade bearing, wherein the component connection includes a first component forming a holding portion, a second component forming a receiving portion, and a connecting portion that holds the second component to the first component in a connected condition, wherein the connecting portion engages into a connection receiving means of the receiving portion, wherein the connecting portion has a through passage extending along an entire length of the connecting portion and leading to the connection receiving means, an intermediate space between the connecting portion and the first and second components, the intermediate space forming a passage configured to be coupled to a pressure source for applying the testing pressure, wherein:
the component connection is a bearing connection that includes a screw connection between a flange and a flange bearing,
the receiving portion is adapted for receiving a ball or roller rotary connection,
the holding portion is a blade flange, the receiving portion is a blade flange bearing, and the connecting portion is a screw connection between the blade flange and the blade flange bearing, and
a series of connecting portions in the form of a plurality of screws are arranged in a concentric peripheral row along the blade flange, the monitoring comprising:
coupling a through passage of the connecting portion to a pressure source to apply a testing pressure to the connection receiving means,
monitoring the testing pressure in the connection receiving means for a defect deviation indicative a connection weakness in the component connection, and
when a defect deviation is detected at least one of the following occurs:
a test signal is emitted, and/or
the wind power installation is stopped.

6. The method according to claim 5 wherein the testing pressure is a pressure above atmosphere.

7. The method according to claim 5 wherein the testing pressure is a pressure below atmosphere.

8. The method according to claim 5 wherein applying the testing pressure comprises applying the pressure pneumatically.

9. The method according to claim 5 wherein applying the testing pressure comprises applying the pressure hydraulically.

10. The according to claim 5 wherein the testing pressure is re-applied after a period of time.

11. The method according to claim 5 wherein the testing pressure is continuously applied with a predetermined amplitude and wherein at least one of:
a defect deviation is detected when a volume flow is above a volume threshold to hold the amplitude, and/or
after a given time period a test is made to ascertain whether a defect threshold value was reached or the applied testing pressure is substantially maintained.

12. A method comprising:
monitoring a component connection in a wind power installation for an unwanted connection weakness in the component connection in a connected condition, the wind power installation comprising a pylon, a pod, a shaft in the pod, the shaft being coupled to a generator, wherein the shaft is drivable by a plurality of rotor blades on a rotor, wherein one of the rotor blades is connected to a hub adaptor by a blade bearing, an intermediate space between the connecting portion and the first and second components, the intermediate space forming a passage configured to be coupled to a pressure source for applying the testing pressure, wherein:
the component connection is a bearing connection that includes a screw connection between a flange and a flange bearing,
the receiving portion is adapted for receiving a ball or roller rotary connection, the holding portion is a blade flange, the receiving portion is a blade flange bearing, and the connecting portion is a screw connection between the blade flange and the blade flange bearing, and a series of connecting portions in the form of a plurality of screws are arranged in a concentric peripheral row along the blade flange, wherein the component connection comprises:

a first component forming a holding portion, a second component forming a receiving portion, and a connecting portion which holds the second component to the first component in the connected condition, wherein the connecting portion engages into a connection receiving means of the receiving portion, wherein the through passage extends along an entire length of the connecting portion, the method comprising:

determining a testing dimension of a bridge between the first and second components, monitoring the testing dimension for a defect deviation that is sufficient to indicate a connection weakness in the component connection in the connected condition, and determining whether the testing dimension exceeds a defect threshold value.

13. The method according to claim 12 wherein the bridge is formed between at least two parts of the first and second components and the connecting portion.

14. The method according to claim 12 wherein the connecting portion engages into a connection receiving means of the receiving portion and the bridge is formed by the connection receiving means.

15. The method according to claim 12 wherein the testing dimension is accommodated by a stationary measuring arrangement at the bridge, wherein the measuring arrangement includes at least one of an electric and magnetic resistance measuring unit.

16. The method according to claim 12 wherein the testing dimension is a distance measurement and monitoring comprises determining whether the distance measurement exceeds a defect distance, wherein the distance measurement is a stationary measuring arrangement at the bridge.

17. The method according to claim 12 wherein the measuring arrangement includes at least one of an ultrasound measuring unit, a strain measuring unit, and a contact measuring unit.

\* \* \* \* \*